United States Patent Office 2,750,017
Patented June 12, 1956

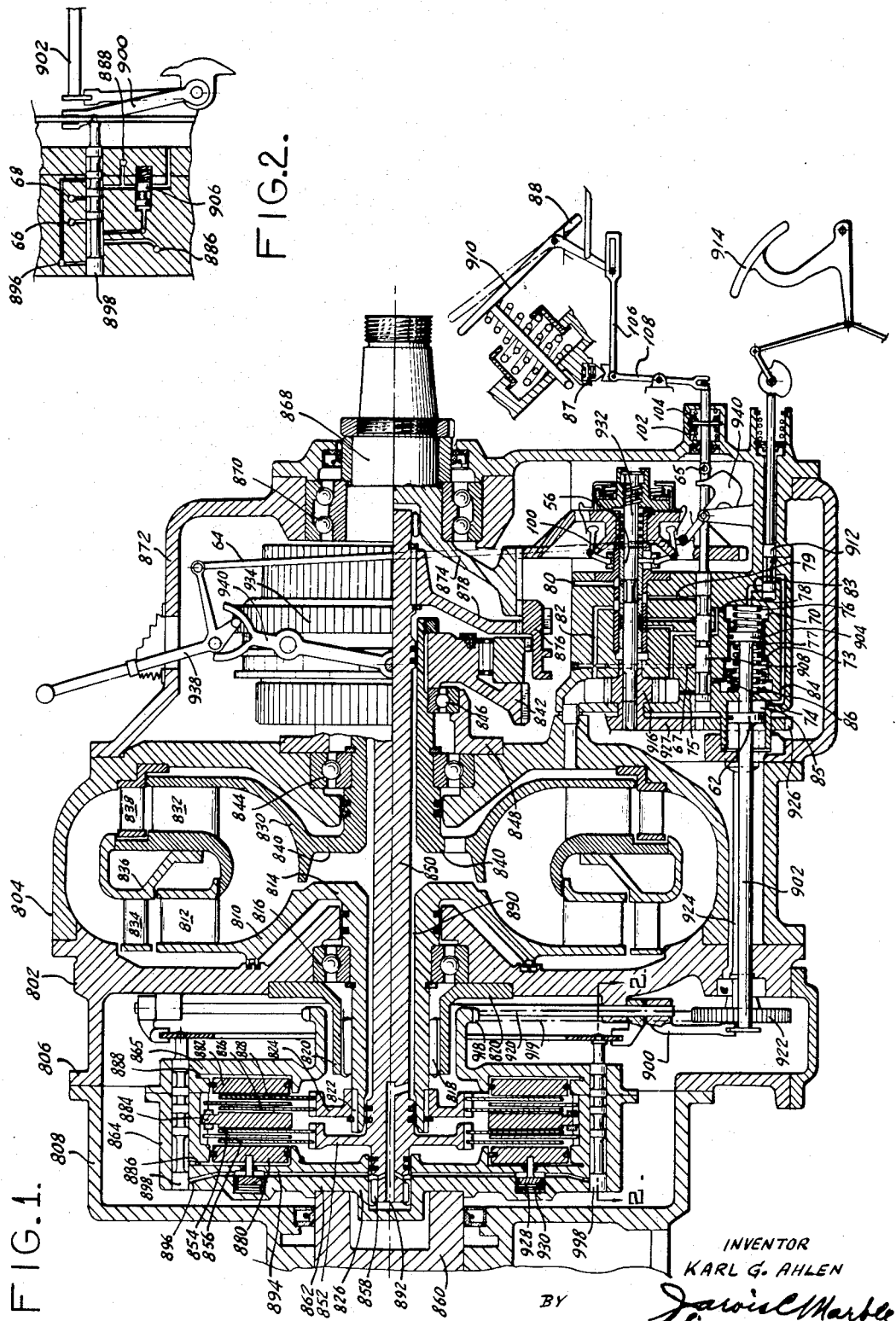
June 12, 1956     K. G. ÅHLÉN     2,750,017
HYDRAULIC POWER TRANSMISSON
Filed Jan. 19, 1950
INVENTOR
KARL G. AHLEN

2,750,017
HYDRAULIC POWER TRANSMISSION

Karl G. Åhlén, Stockholm, Sweden, assignor, by mesne assignments, to Svenska Rotor Maskiner Aktiebolag, Nacka, Sweden, a corporation of Sweden Application January 19, 1950, Serial No. 139,453

5 Claims. (Cl. 192—3.2)

This invention relates to power transmissions of the kind embodying a variable speed hydraulic torque converter for producing an increase in the torque applied to the driven or output member as compared with the torque delivered by the engine or other power source to the input member of the transmission and wherein the torque converting hydraulic drive is employed in the transmission in conjunction with an alternative drive providing a direct drive connection between the driving and driven members of the transmission and adapted to be used in alternation with the hydraulic torque converter.

The primary object of the invention is to provide a power transmission of the above character wherein shifting of the drive from the hydraulic drive to the alternative drive may be effected automatically in response to certain predetermined conditions of operation.

A further object of this invention is to provide a power transmission in which the automatic shift of the drive is subject to an overruling control which will permit the shift from one drive to the other to be made at the will of the operator when the circumstances are such that said shift will not result in improper or inefficient operation of the transmission.

According to the present invention in a power transmission of the above mentioned character a control device for producing the different operating conditions in the transmission including idle running, converter drive, direct drive and reverse movement, and hydraulic braking, is provided in which the control device between converter drive and direct drive on switching in the direct drive automatically effects the release of the converter drive, and in which simultaneously with the engagement of the direct drive the converter drive can be manually engaged, with the switching-out of the action of the automatic release, which follows from the coupling of the driving shaft with the impeller shaft of the torque converter.

The invention also includes a transmission for transmitting power from a driving member to a driven member which comprises a first means including a hydrodynamic torque converter, a second means for alternatively transmitting power between said members, and control means responsive to an impulse indicative of a predetermined value of the speed ratio between said members produced by said first means for shifting the path of power transmission from said first means to said second means.

The invention will be hereinafter more fully described with reference to the accompanying drawing illustrating a hydraulic torque converter with a stationary casing and provided with a control system according to the present invention.

In this drawing:

Fig. 1 is a diagrammatic longitudinal central section of the hydraulic torque converter and control system according to the invention; and Fig. 2 is a detail of the control system.

The hydraulic torque converter illustrated has a stationary casing formed of two parts 802 and 804 connected by means of bolts. This casing is intended to be bolted by means of a flange 806 to the crank case or another stationary member 808 of an internal combustion engine. Said casing, which forms a chamber for circulation of the working fluid, contains an impeller wheel 810, having blades designated by 812. The impeller wheel 810 is connected with a hollow shaft 814, journalled in a ball bearing 816 in the part 802 of the casing and also in a needle bearing 818 provided in a flange-like member 820 bolted to the part 802 of the stationary casing. The end portion of the shaft 814 carries a disc 824 by means of splines 822, the disc supporting two coupling plates 826 and 828.

In addition to the impeller wheel the casing of the converter contains a turbine wheel 830, having two blade rings 832 and 834 interconnected by means of an annular member 836. To the member 804 of the casing is fixed a guide blade ring 838. The turbine wheel 830 is connected with a hollow shaft 840 having at its outer end a gear wheel 842 secured by splines. The shaft 840 is journalled in a ball bearing 844 in the casing member 804 and also in a ball bearing 846, located in a flange-like member 848 rigidly connected to the casing member 804.

Through the hollow shafts 814 and 840 passes an internal shaft 850, which at one end carries a flange 852 supporting two coupling plates 854 and 856. The shaft 850 is at this end journalled by means of a needle bearing 858 in a disc member 862 connected with the engine shaft 860 and provided at its circumference with a cylindrical portion 864, to which is bolted a disc 865, carrying at its inner circumference a toothed rim 918. The shaft 850 is at its opposite end journalled by means of a needle bearing 866 in the driven shaft 868, which in turn is journalled in a ball bearing 870 arranged in a housing 872 connected with the member 804 of the stationary casing. The driven shaft 868 carries a gear wheel 874, which can be coupled by means of an axially movable toothed ring 876 with a gear wheel 878 fixed to the shaft 850.

An annular disc 880 serves as a piston for the clutch intended for direct drive and an annular disc 882 as a piston for the clutch intended for hydraulic drive. A stationary supporting plate is shown at 884. The plates 854 and 856 are axially movable on the flange 852 and the plates 826 and 828 are axially movable on the disc 824. A conduit for supplying pressure liquid to the clutch for direct drive is shown at 886 and a conduit for supplying pressure liquid to the clutch for hydraulic drive is shown at 888. Pressure liquid will pass through a conduit system 890, 892, 894 from the hydraulic converter to the inlet 896 of a main valve 898, which is actuated by means of an arm 900 by a spindle 902 from an operating piston of a servo-motor 904 of the main valve.

A gear wheel pump 916 is provided for supplying the pressure liquid to the hydraulic converter and to the above mentioned clutches, and is driven from the toothed rim 918 by means of a chain 919 engaging a gear wheel 922 which rotates a shaft 924 and a gear wheel 926 in geared connection with the pump by means of a wheel 927, so that the cog wheel pump 916 will always operate as soon as the engine shaft rotates. Pistons 928, actuated by springs 930, serve to engage the clutch for direct drive when the engine is stalled and when there is no liquid pressure in the system. These pistons are pressed backwardly against the force of the springs 930 by means of the pressure liquid passing through the conduit 894 when the cog wheel pump 916 starts up.

The main parts of the control system for automatic shifting of the hydraulic torque converter comprise the following: A coupling impulse-giver consisting of a quota-regulator actuating a valve spindle 932, a centrifugal regualtor 100 acting in two stages and actuating a sleeve 56 surrounding the spindle 932 of the quota-regulator, the main valve 898 which distributes the pressure liquid to the actual servo-motor for providing neutral position, hydraulic drive, direct drive or brake; a link system 920, 900, 902, a servo-motor 904 for setting the main valve in one or more of the four mentioned positions; a valve 908 which by means of a spring system 102, 104 is held in its middle position but is actuatable by the throttle pedal 910 through a link system 106, 108 to be set in one or the other of its outer positions; a valve 912 which is connected with, for instance, the brake pedal 914; a link system 938, 64, which determines the position of the valve 908 when the gear later switched in is not perfectly engaged in forward or reverse. The spring-loaded pistons 928 which engage direct drive are as mentioned above so arranged that this coupling action automatically ceases when the pump 916 for the servo-motor fluid is operating.

The valve 908 is at the highest position of the gas pedal 910 held in such a position by the stop device 87 for the gas pedal that a disengagement of the direct drive as well as of the converter drive is effected. The gas pedal will be held in this position by the lower part 88 of the gas pedal. This will be utilized when it is desired to perfectly interrupt the torque, i. e. to avoid creeping.

The cam disc 940 will be turned by the lever 938 and the rod 64 to such a position that the valve 908 will be displaced by the pressure on the bolt 65. In order to make direct drive free the channel 886 has to be in communication with the outlet 66. This will be attained thereby that the valve 898 is in the position for hydraulic drive or in neutral position. The valve 898 will be placed in hydraulic position when only the springs 76 and 77 hold the piston servo-motor 904 whereby the working chamber 70 by means of the channels 78 and 79 over the valves 908 and 56 are in communication with the suction side of the pump, and in neutral position when the valve 908 is in the position to the right, whereby pressure liquid can flow from the channel 67 to the channel 74, whereby the piston servo-motor 904 will be moved to the right and by means of the link system will displace the valve 898 to neutral position, whereby also the channel 888 will get into communication with the outlet 68 via the valve 898.

The sleeves of the coupling impulse-giver due to the three different positions of the centrifugal regulator sleeve and the two positions of the quota-regulator sleeve provide six different coupling combinations which are utilized to direct the pressure liquid from the pump 916 through the valve 908 to the servo-motor 904 in this way regulating the main valve 898 so as to obtain with different combinations of the gas admission and the speeds of the secondary shaft, the required coupling combinations of the clutch for hydraulic drive and that for direct drive. Due to actuation of the valve 908 by the throttle pedal 910, there results with the throttle pedal released and the centrifugal regulator 100 in its inner position, disengagement of both the direct clutch and the hydraulic clutch while with the centrifugal regulator in its middle position and the throttle pedal pressed down to its lowest position hydraulic drive is always engaged. If the throttle pedal is released and the brake pedal 914 pressed in at a vehicle speed where the centrifugal regulator 100 is in its middle position or its outer position, in addition to direct drive the pump of the hydraulic torque converter is also engaged to effect hydraulic braking. This pedal which is further provided to act as a brake pedal for the vehicle, at the first part of the pressing down of the same, will effect an engagement of the hydraulic braking and at the last part of the pressing down an engagement of the hydraulic braking as well as the braking of the vehicle.

The link system 938, 64, 940 due to its shifting of the valve 908 causes the direct clutch as well as the hydraulic clutch to be disengaged when shifting from forward to reverse.

The coupling of the direct drive by means of the pistons 928 and springs 930 at stalling or idling engine speeds provides for push-start of the vehicle and also the use of the motor as a parking brake.

The coupling for the through-going shaft 850 is disengaged in hydraulic as well as in neutral position. When the gas pedal is unloaded as in the illustrated position and the valve 908 is in shown position and the centrifugal governor 100 with its sleeve 50 is in its middle position and, further, the valve spindle 932 is in its position to the left, pressure liquid will be conducted through the pipe 82, through the valves 56 and 932 to the channel 79 and further through the valve 908 to the channel 78 and therefrom to the working chamber 70. When the valve 912 is displaced to the left the channels 83 and 84 will get into communication with each other, whereby the working chamber 85 will be filled with pressure liquid, whereby the piston 62 on compression of the springs 77 and 86 by means of the link system 902, 900, 920 will displace the valve 898 to its outermost position to the left, whereby the channel 896 will get into communication with the channels 886 and 888, whereby the coupling for direct drive as well as that for hydraulic drive will be engaged.

The main valve 898 is combined with a valve 906 which is shifted by the pressure liquid from the servo-motor of the direct clutch and opens the outlet from the servo-motor of the clutch intended for hydraulic drive. Due to this construction, engagement of the direct drive is attained without any interruption in the drive.

The construction of the reverse gear designated by 934 is of the type hitherto generally in use with hydraulic torque converters according to applicant's system and comprises inter alia a free wheel 936 allowing the turbine to remain stationary when the driven shaft runs in the same direction as the engine shaft when driven otherwise than by the hydraulic converter. The link system designated by 938 includes a further link 940 ensuring disengagement of the clutch for direct drive as well as that for hydraulic drive, when shifting of the reverse gear takes place.

It is to be understood that the invention is not limited to the specific and detailed construction of apparatus herein disclosed.

I claim:

1. A power transmission for transmitting power through different paths of power flow from a driving member to a driven member, one of said paths including a variable speed hydraulic torque converter having an impeller member, a turbine member and a guide member, a first clutch for operatively connecting said driving member with said impeller member to transmit power through said one of said paths of power flow, a second clutch operable independently of said first clutch for operatively connecting said driving member with said driven member to transmit power through another of said paths of power flow, and a control system for said clutches selectively operable to simultaneously cause engagement of both of said clutches.

2. A power transmission as defined in claim 1 in which said control system is selectively operable to cause simultaneous disengagement of both of said clutches.

3. A power transmission as defined in claim 1 in which each of said clutches includes a pressure responsive element for causing engagement of the clutch and said control system comprises means for supplying pressure fluid and valve means selectively operable to admit pressure fluid simultaneously to both of said pressure responsive elements.

4. In a power transmission for transmitting power from an engine to a driven member alternatively through two different paths of power transmission one of which paths includes a variable speed hydraulic torque converter having an impeller member, a turbine member and a guide member and a first pressure fluid actuated clutch between said engine and said impeller member and the other of which paths includes a second pressure fluid actuated clutch between said engine and said driven member, a hydraulic control system including a circuit for clutch actuating pressure fluid and a multiple way valve located in said circuit for controlling the operation of said clutches, said valve in a first position directing said pressure fluid to cause engagement of said first clutch and release of said second clutch to thereby provide power transmission through said torque converter, in a second position directing said pressure fluid to cause release of said first clutch and engagement of said second clutch to thereby provide power transmission through an alternative path, in a third position directing said pressure fluid to cause engagement of both of said clutches to thereby provide at the same time both a mechanical connection between said engine and said driven member and a mechanical connection between said engine and said impeller member, whereby to effect combined hydraulic braking and engine braking, and in a fourth position directing said pressure fluid to cause release of both of said clutches to thereby provide a neutral in which no power is transmitted to said driven member.

5. Apparatus as defined in claim 4 including a speed ratio regulator responsive to the speed ratio between said driven member and said engine, a speed responsive device responsive to the speed of the driven member and a servomotor, said servomotor being operatively connected to actuate said multiple way valve and being responsive to said speed ratio regulator to shift said multiple way valve from said first position to said second position, said speed responsive device being operatively associated with said speed ratio regulator to permit the latter to act to cause the multiple way valve to be moved from said first position to said second position only when the speed of the driven member is above a predetermined minimum value.

References Cited in the file of this patent
UNITED STATES PATENTS

| | | |
|---|---|---|
| 1,859,607 | Sinclair | May 24, 1932 |
| 1,960,705 | Kochling | May 29, 1934 |
| 2,168,350 | Lapsley | Aug. 8, 1939 |
| 2,279,019 | Black | Apr. 7, 1942 |
| 2,354,596 | Jandasek | July 25, 1944 |
| 2,377,009 | Heyer | May 29, 1945 |
| 2,523,783 | Schjolin | Sept. 26, 1950 |
| 2,619,848 | Carnagua | Dec. 2, 1952 |